(12) United States Patent
Ardhanari et al.

(10) Patent No.: US 7,688,728 B2
(45) Date of Patent: Mar. 30, 2010

(54) METHOD OF CONTROLLING A DATA FLOW, TRANSMITTER AND DATA TRANSMISSION SYSTEM

(75) Inventors: Guruprasad Ardhanari, Bangalore (IN); Raj Kumar Jain, Singapore (SG)

(73) Assignee: Infineon Technologies AG, Munich (DE)

( * ) Notice: Subject to any disclaimer, the term of this patent is extended or adjusted under 35 U.S.C. 154(b) by 374 days.

(21) Appl. No.: 11/674,501

(22) Filed: Feb. 13, 2007

(65) Prior Publication Data

US 2008/0192631 A1    Aug. 14, 2008

(51) Int. Cl.
  *G08C 15/00* (2006.01)

(52) U.S. Cl. .................................... 370/230.1; 370/232

(58) Field of Classification Search ................. 370/229, 370/230, 230.1, 231, 232, 233, 234, 235, 370/236

See application file for complete search history.

(56) References Cited

U.S. PATENT DOCUMENTS

| | | | | |
|---|---|---|---|---|
| 4,447,873 A | * | 5/1984 | Price et al. | 710/53 |
| 5,541,926 A | * | 7/1996 | Saito et al. | 370/474 |
| 5,914,936 A | * | 6/1999 | Hatono et al. | 370/230 |
| 6,167,029 A | * | 12/2000 | Ramakrishnan | 370/235 |
| 2006/0109784 A1 | * | 5/2006 | Weller et al. | 370/229 |
| 2007/0248118 A1 | * | 10/2007 | Bishara et al. | 370/469 |

* cited by examiner

*Primary Examiner*—Chi H Pham
*Assistant Examiner*—Weibin Huang
(74) *Attorney, Agent, or Firm*—Coats & Bennett, P.L.L.C.

(57) ABSTRACT

A method of controlling a data flow, a transmitter and a data transmission system are described. For example, in a method of controlling a data flow of a transmitter, first data is received at a first interface. The first data is buffered in a buffer. The first data is output via a second interface. Information is determined regarding an estimated amount of second data comprising payload data output via the first interface until a filling level of the buffer will reach a predetermined threshold. An amount of the payload data output via the first interface is adjusted based on the information. The payload data is then output via the first interface. Similarly, a transmitter includes an interface to output payload data and a control signal, and a buffer to buffer further data received via the interface wherein the control signal controls a flow of said further data.

43 Claims, 13 Drawing Sheets

METHOD OF CONTROLLING A DATA FLOW, TRANSMITTER AND DATA TRANSMISSION SYSTEM

BACKGROUND OF THE INVENTION

The present invention relates to a method of controlling a data flow, a transmitter and a data transmission system.

BRIEF DESCRIPTION OF THE DRAWINGS

Hereinafter, exemplary embodiments of the invention will be described with reference to the drawings.

DETAILED DESCRIPTION OF THE INVENTION

Figure 1:
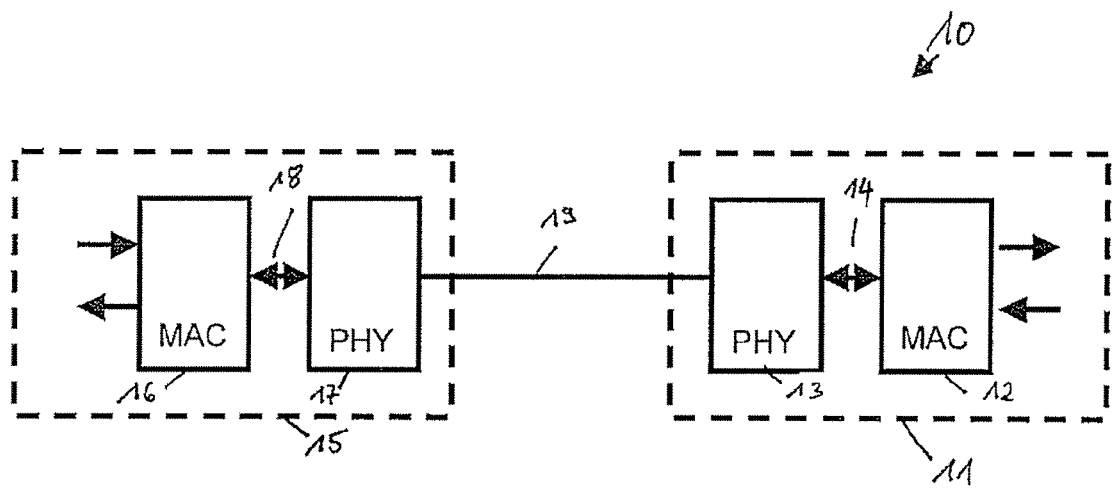
FIG. 1 is a schematic block diagram representation of a transmission system.

In the following detailed description, exemplary embodiments of the present invention will be described in detail. It is to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

It is also to be understood that, in the following description of exemplary embodiments, any direct connection or coupling between functional blocks, devices, components, or other physical or functional units shown in the drawings or described herein could also be implemented by an indirect connection or coupling.

It is to be understood that the features of the various exemplary embodiments described herein may be combined with each other, unless specifically noted otherwise.

The present invention generally relates to the field of data transmission and, in particular, to controlling data flows in data transmission. FIG. 1 is a schematic block diagram representation of a transmission system 10 which comprises a first transceiver 11 and a second transceiver 15 coupled to each other via a data connection 19. The first transceiver 11 comprises a media access control (MAC) unit 12 and a physical layer (PHY) unit 13 coupled to the MAC unit 12 via an interface 14. Similarly, the second transceiver 15 comprises a MAC unit 16 and a PHY unit 17 coupled to the MAC unit 16 via an interface 18. The PHY units 13, 17 are respectively coupled to the data connection 19 and perform transmission convergence (TC) layer functions for data transmission between the first transceiver 11 and the second transceiver 15.

When the need arises, the data flow between the transceivers 11, 15 of the transmission system 10 may be controlled such that one of the MAC units 12, 16 transmits a corresponding control signal via the data connection 19 to the other MAC unit. Conventional MAC units 12, 16 communicating with each other via the intermediate PHY units 13, 17 may employ Ethernet pause frames to assert and to deassert backpressure, thereby controlling data flow between the transceivers 11, 15. For this purpose, the MAC units 12, 16 my include functions on a MAC control layer that processes Ethernet pause frames for backpressure assertion and deassertion.

The term "assertion of backpressure" as used in the following refers to a control operation by which one unit limits or fully suppresses a data flow that the one unit receives from another unit. In one embodiment, the control operation may comprise transmission of a control signal, such as an Ethernet pause frame, to the other unit to direct the other unit to limit or stop transmission of further data to the one unit. Similarly, the term "deassertion of backpressure" as used in the following refers to a control operation by which one unit fully or partially restores a data flow that it received from another unit. In an embodiment, the control operation may comprise transmission of a control signal, such as an Ethernet pause frame, to terminate a state in which backpressure has been asserted. In another embodiment, the control operation may comprise transmission of a control signal, such as an Ethernet pause frame, to the other unit to direct the other unit to resume data transmission to the one unit. The term "to backpressure" as used in the following relates to control operations associated with the assertion and deassertion of backpressure.

Figure 10:
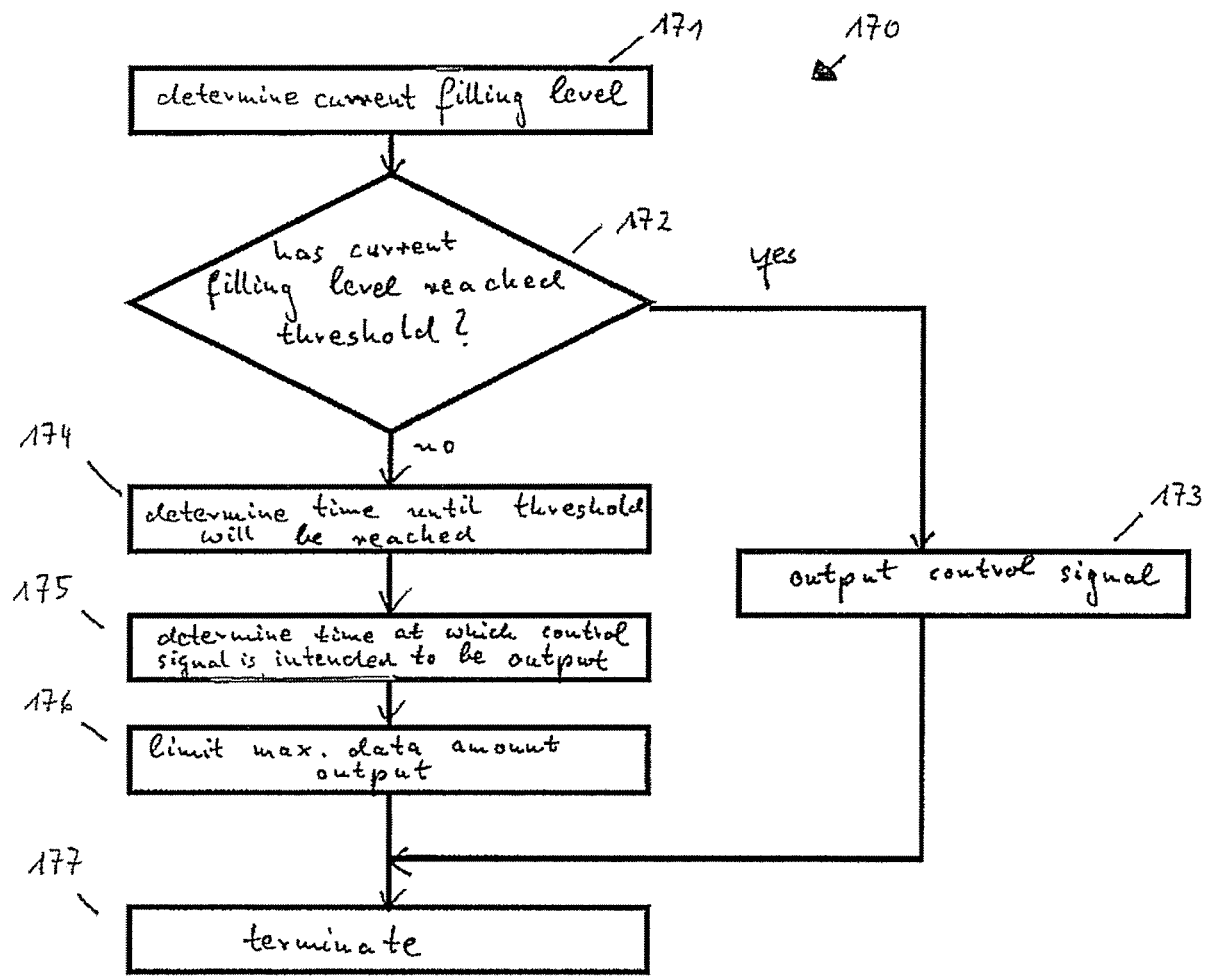
FIG. 10 is a schematic flow diagram representation of a method of controlling a data flow according to another embodiment of the invention.

In devices such as the transceiver 11, 15 of the transmission system of FIG. 10, the need may arise for the PHY unit 13 to backpressure the associated MAC unit 12, or for the PHY unit 17 to backpressure the associated MAC unit 17. Conventionally, this backpressuring may be achieved by configuring the interfaces 14 and 18 to operate in half duplex mode.

Figure 2:
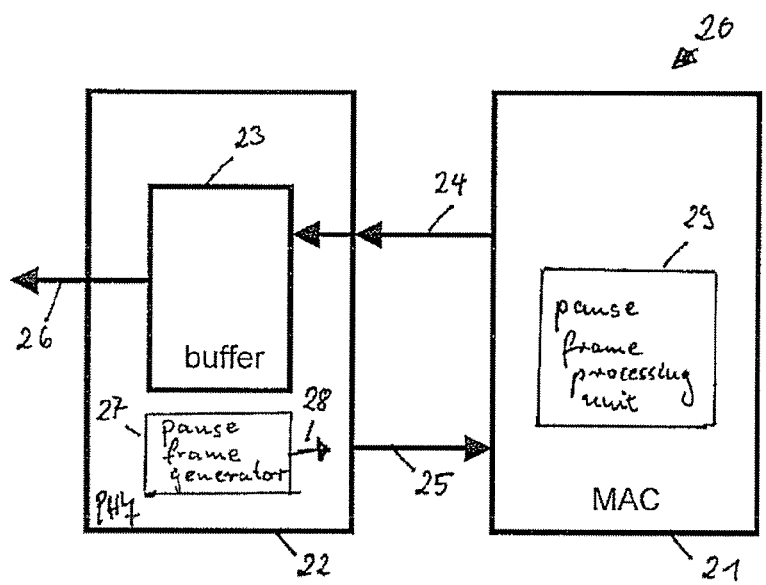
FIG. 2 is a schematic block diagram representation of a data transmitter.

FIG. 2 is a schematic block diagram representation of a transmitter 20 according to an embodiment. The transmitter may be used, e.g., in the transceivers 11, 15 of the transmission system of FIG. 1. The transmitter 20 comprises a MAC unit 21 and a PHY unit 22 which includes a buffer 23. The PHY unit 22 is coupled to the MAC unit 21 via an interface, e.g., a media independent interface (MII) to receive data 24 from the MAC unit 21 and to transmit data 25 to the MAC unit 21. The data 24 received at the PHY unit 22 is first buffered in the buffer 23 before being output as data 26 from the PHY unit 22, possibly after performing additional data processing. The data 25 transmitted from the PHY unit 22 to the MAC unit 21 may comprise payload data and control signals. In an embodiment, the control signals may be employed to control the flow of data 24 in order to prevent, e.g., an overflow of the buffer 23. In the embodiment of FIG. 2, the PHY unit 22 comprises a pause frame generator 27 to generate a pause frame 28 that is output and transmitted to the MAC unit 21 to backpressure the MAC unit 21. In an embodiment, the pause frame is an Ethernet pause frame. In an embodiment, the pause frame generator 27 is coupled to the buffer 23 to determine a buffer filling level and generates the pause frame based on a comparison of the buffer filling level to predetermined thresholds, namely a backpressure assertion threshold and a backpressure deassertion threshold. In other embodiments that will be more fully described below, other methods may be employed to control the transmission of pause frames and/or payload data from the PHY unit 22 to the MAC unit 21. The MAC unit 21 comprises a pause frame processing unit 29 that receives the pause frame 28 and controls the outputting of data 24 from the MAC unit 21 to the PHY unit 22. In an embodiment, the pause frame processing unit 29 limits or reduces the flow of data 24 that is output from the MAC unit 21 or reestablishes a flow of data 24 in response to receiving the pause frame 28.

Figure 3:
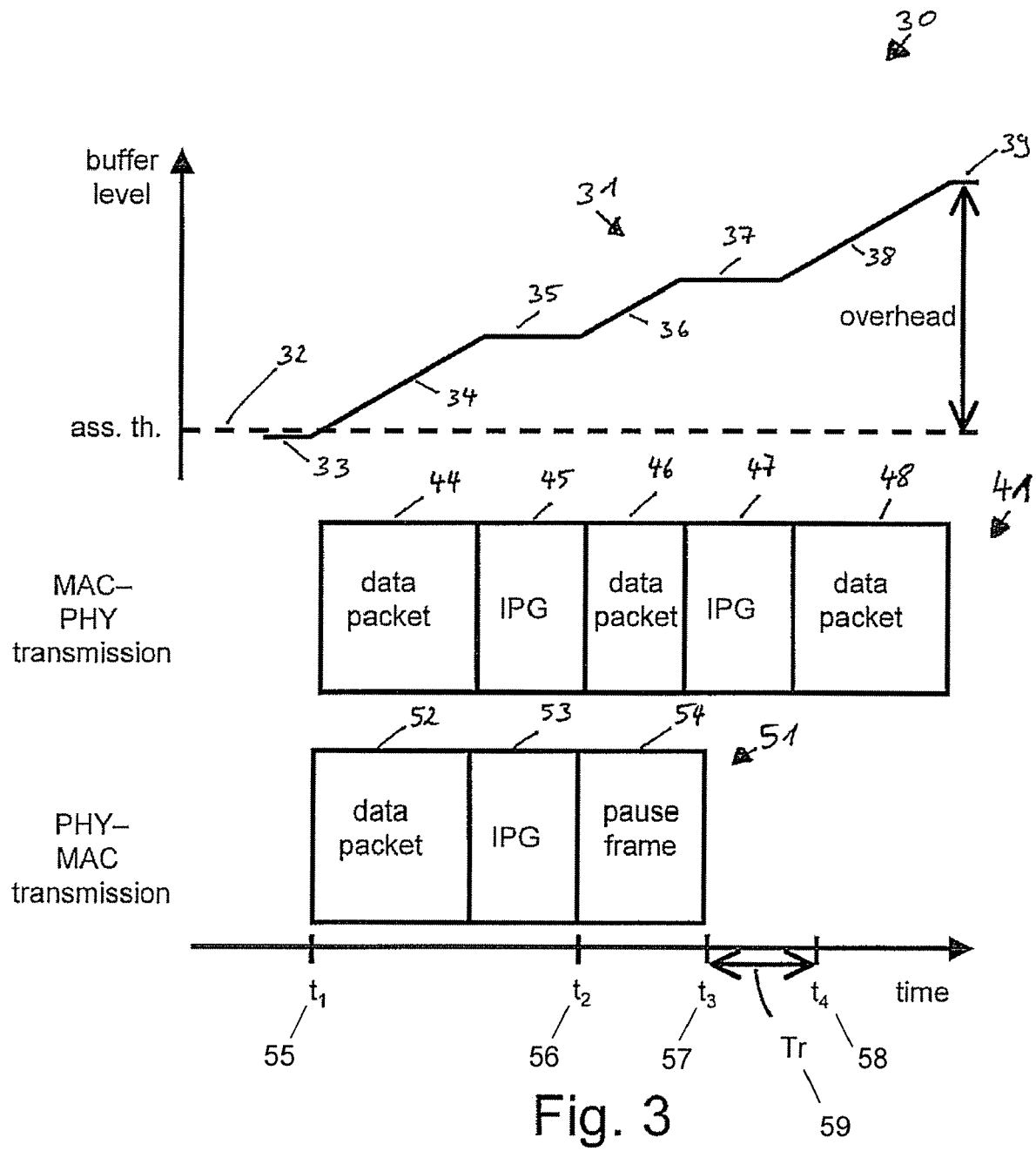
FIG. 3 is a schematic representation of a buffer filling level versus time in a transmitter.

FIG. 3 is a schematic representation 30 of an exemplary buffer filling level 31 as a function of time for backpressure assertion if a pause frame is transmitted when an assertion threshold has been reached or exceeded. FIG. 3 also shows data 41 transmitted from the MAC unit to the PHY unit and data 51 transmitted from the PHY unit to the MAC unit. The MAC-PHY interface is assumed to be a full duplex interface via which data packets are transmitted, the allowed size of data packet being given by a maximum allowed packet size. In an embodiment, the packets are Ethernet frames. In FIG. 3, the buffer filling level is originally at a level 33 that is just below the assertion threshold 32. The assertion threshold 32 is exceeded during the transmission of a data packet 44 from the MAC unit to the PHY unit. The transmission of a data packet 52 from the PHY unit to the MAC unit is started at a time $t_1$ 55 just before the data packet 44 is received at the PHY unit from the MAC unit. As shown in FIG. 3, although the assertion threshold 32 is exceeded just after $t_1$ 55, the pause frame is transmitted from the PHY unit to the MAC unit after the transmission of the data packet 52 has been completed and the interpacket gap 53, i.e., the required gap between the transmission of different data packets, has passed at time $t_2$ 56. The backpressure assertion does not take effect until the transmission of the pause frame 54 has been completed at time $t_3$ 57 and the pause frame has been processed in the MAC unit at time $t_4$ 58, which requires a response time Tr 59. Until the backpressure assertion takes effect at $t_4$ 58, data may continue to be transmitted from the MAC unit to the PHY unit to be buffered in the buffer, thereby increasing the buffer filling level as seen at sloped portions 34, 36 and 38 of the curve 31. In the exemplary FIG. 3, until time $t_4$ 58, data packets 44 and 46 are completely transmitted, and the transmission of yet another data packet 48 is started just before the backpressure assertion takes effect at time $t_4$ 58. Correspondingly, the buffer filling level increases during transmission of the data packets 44, 46 and 48 in sloped portions 34, 36 and 38 until it reaches a final level 39. In order to prevent buffer overflow, the buffer is overdimensioned and comprises a sufficiently large overhead above the assertion threshold 32. As may be seen from FIG. 3, the overhead $O_A$ above the assertion threshold 32 is given by Eq. (1):

$$O_A = 2 \times M\max + \frac{Tr - IPG}{Tm} + P, \qquad (1)$$

where Mmax is a maximum possible size of a data packet, P is the size of the pause frame, Tr is the reaction time of the MAC unit to respond to a pause frame, IPG is the interpacket gap in time, and Tm is the time required for the transmission of one byte via the MAC-PHY interface.

Figure 4:
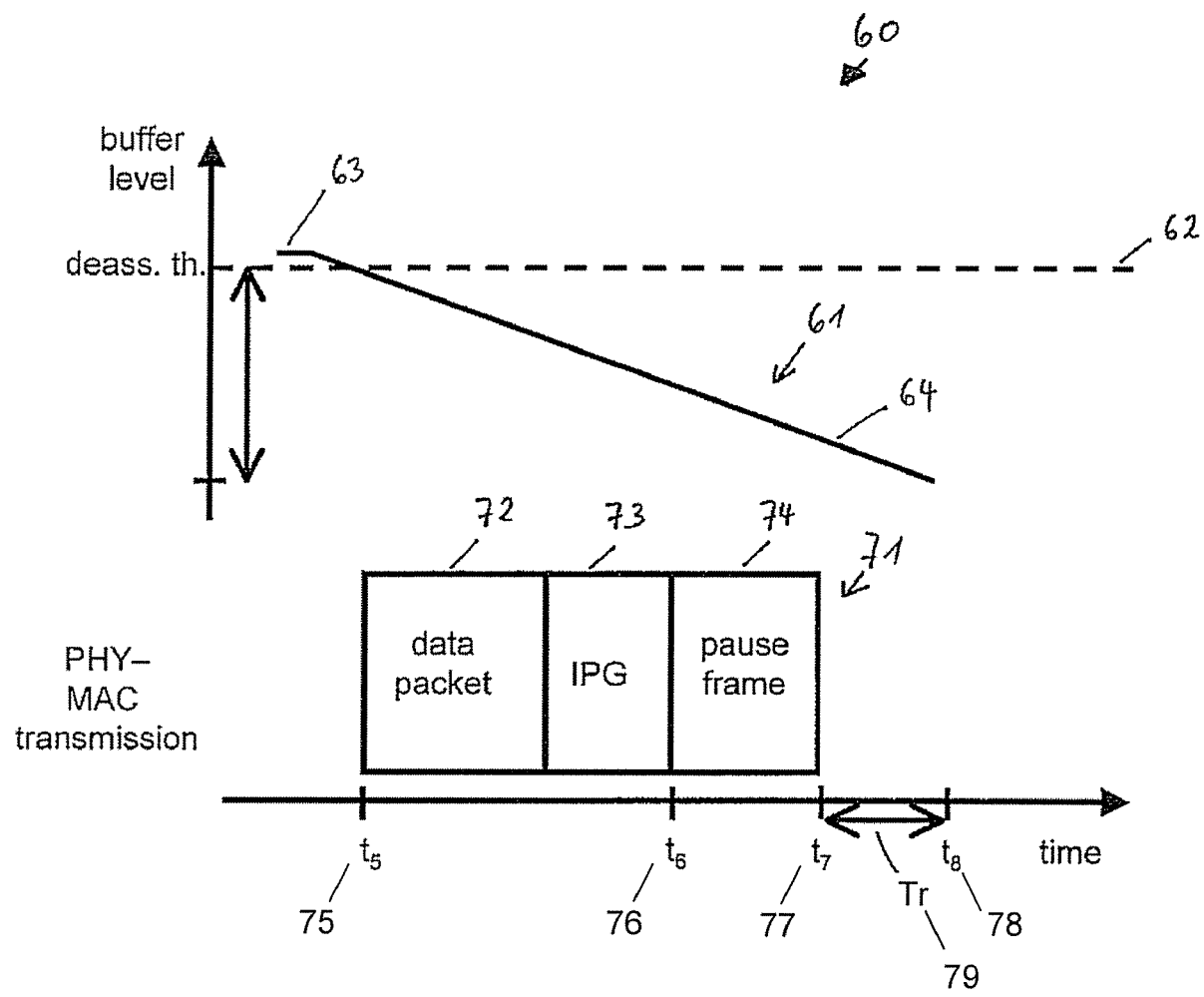
FIG. 4 is a schematic representation of a buffer filling level versus time in a transmitter.

In an embodiment, the PHY unit may also deassert backpressure based on a comparison of buffer filling level and a deassertion threshold. FIG. 4 is a schematic representation 60 showing the buffer filling level 61 as a function of time in a state in which backpressure has been asserted and is to be deasserted after the buffer filling level falls below a deassertion threshold 62. In FIG. 4, the transmission of a data packet 72 from the PHY unit to the MAC unit has started at a time $t_5$ 75 just before the buffer filling level 61 has reached the desassertion threshold 62. A pause frame 74 is transmitted after transmission of the data packet 72 has been completed and an interpacket gap 73 has passed, i.e., at time $t_6$ 76. Backpressure deassertion takes effect after the transmission of the pause frame 74 has been completed at time $t_7$ 77 and the pause frame has been processed by the MAC unit at time $t_8$ 78 which requires a response time Tr 79. As may be seen from FIG. 4, the buffer filling level may fall significantly below the deassertion threshold 62 until the deassertion takes effect at time $t_8$ 78. In order to avoid starvation of a buffer read process of the PHY unit, the deassertion threshold will therefore be selected to be sufficiently high.

Figure 5:
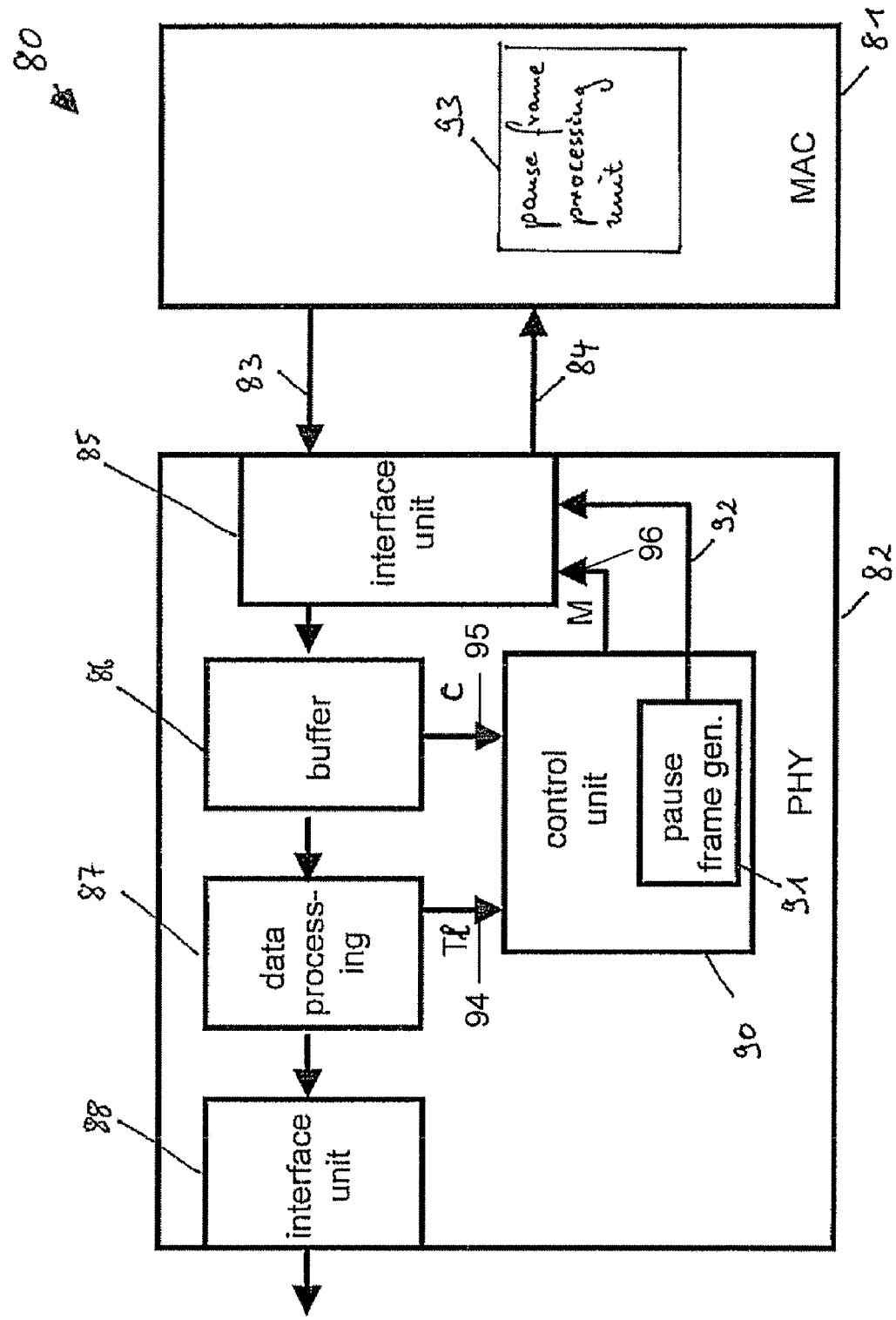
FIG. 5 is a schematic block diagram representation of a transmitter according to another embodiment of the invention.

FIG. 5 is a schematic block diagram representation of a transmitter 80 according to another embodiment of the invention which comprises a MAC unit 81 and a PHY unit 82 coupled to each other via an interface, e.g., a MII interface. In an embodiment, the interface is a reduced media independent interface (RMII). In another embodiment, the interface is a serial media independent interface (SMII). In another embodiment, the interface is a source synchronous serial media independent interface (SSSMII). In an embodiment, the MAC-PHY interface is an interface operated in a full duplex mode. The PHY unit 82 comprises an interface unit 85 to receive data 83 from the MAC unit 81 and to transmit data 84 to the MAC unit 81. The PHY unit 82 further comprises a buffer 86 coupled to the interface unit 85 to buffer data 83 received from the MAC unit, a data processing unit 87 coupled to the buffer 86 to read data from the buffer 86, and an interface unit 88 coupled to the data processing unit 87 to output the processed data from the PHY unit 82.

The transmitter 80 further comprises a control unit 90 coupled to the interface unit 85 to control outputting of data from the PHY unit 82 to the MAC unit 81. In the exemplary embodiment of FIG. 5, the control unit 90 provides a signal M 96 to the interface unit 85, the signal M being indicative of a maximum size of a data packet carrying payload data that is output from the PHY unit 82 to the MAC unit 81. As used herein, the term "payload data" relates to any data transmitted from a PHY unit to a MAC unit that is not control data generated by a component of the PHY unit. The control unit 90 is further coupled to the buffer 86 to receive a signal C 95 indicative of a current filling level of the buffer 86 from the buffer 86, and is coupled to the data processing unit 87 to receive a signal Tl 94 from the data processing unit 87. The signal Tl 94 is indicative of a time which is left before the data processing unit 87 will next read data from the buffer 86. The buffer filling level will be reduced in the read. In an embodiment, the data processing unit 87 reads the buffer 86 in bursts, the time between successive read bursts being at least approximately known.

The control unit 90 generates the signal M 96 indicative of a maximum packet size based on the signal Tl 94 and the signal C 95, i.e., based on the current buffer filling level and based on the time left before the buffer 86 will be read again. In an embodiment, the control unit 90 determines the maximum data packet size M 96 based on Tl 94 and C 95 such that, at the time at which a control signal, such as a pause frame, is intended to be transmitted from the PHY unit 82 to the MAC unit 81, the interface is kept free from the transmission of payload data in the PHY-MAC direction. In an embodiment, by controlling the outputting of payload data at the interface unit 85, the control unit 90 may ensure timely transmission of pause frames for asserting or deasserting backpressure. In an embodiment, the control unit 90 may determine a lower bound for a time at which a control signal, such as a pause frame, is intended to be transmitted from the PHY unit 82 to the MAC unit 81 based on the signals C 95 and Tl 94 and may limit the amount of payload data transmitted from the PHY unit 82 to the MAC unit 81 so that, by the time at which the control signal is intended to be transmitted, the transmission of the payload data in the PHY-MAC transmission direction is completed. Various other exemplary embodiments for controlling the outputting of data from the PHY unit 82 will be described in more detail below.

The control unit 90 further comprises a pause frame generator 91 coupled to the interface unit 85 to provide a pause frame 92 to the interface unit 85, which pause frame is then output via the interface unit 85 to the MAC unit 81. In an embodiment, the pause frame generator 91 generates the pause frame 92 based on the current filling level C 95. In another embodiment, the pause frame generator 91 generates the pause frame 92 based on the current buffer filling level C 95 and the time Tl 94 left before the next read of the buffer 86. The MAC unit 81 comprises a pause frame processing unit 93 that receives the pause frame 92 and controls the outputting of data 83 from the MAC unit 81 to the PHY unit 82 responsive to the pause frame 92. In an embodiment, the pause frame processing unit 93 limits or reduces the flow of data 83 that is output from the MAC unit 81 or reestablishes a flow of data 83 in response to receiving the pause frame 92.

It is to be understood that, while in the exemplary embodiment of FIG. 5, the control signal output from the PHY unit 82 to the MAC unit 81 is a pause frame, any other suitable control signal may also be employed for asserting or deasserting backpressure, or for otherwise controlling data transmission between the MAC unit 81 and the PHY unit 82.

While, in the exemplary embodiment of FIG. 5, the control unit 90 is coupled to the buffer 86 to receive an indicator C 95 of a current buffer filling level from the buffer 86, according to various other embodiments, the control unit does not need to be directly coupled to the buffer.

Figure 6:
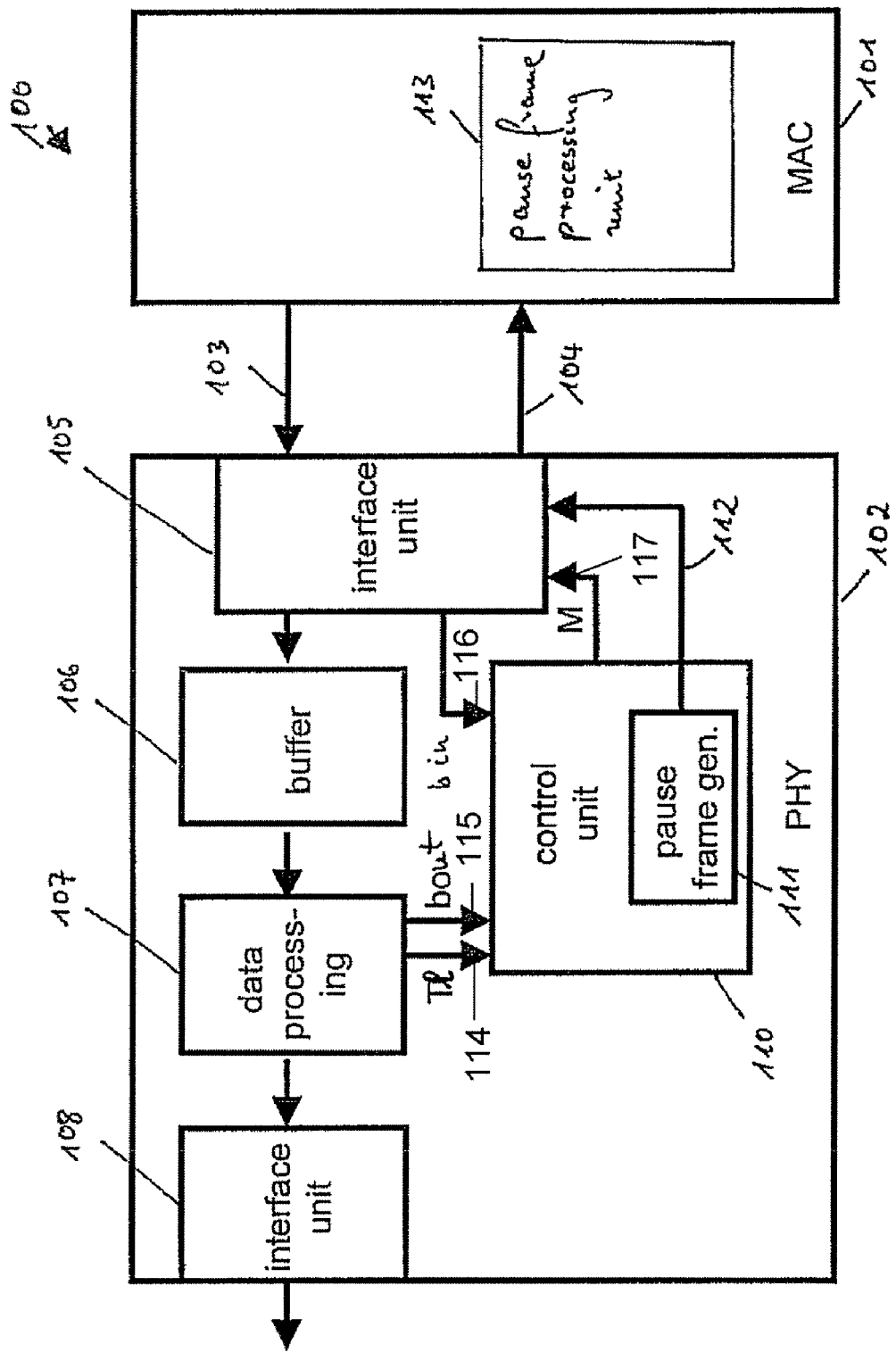
FIG. 6 is a schematic block diagram representation of a transmitter according to another embodiment of the invention.

FIG. 6 is a schematic block diagram representation of a transmitter 100 according to another exemplary embodiment which comprises a MAC unit 101 and a PHY unit 102. The PHY unit 102 comprises an interface unit 105 coupled to the MAC unit 101 via a data connection to receive data 103 from the MAC unit 101 and to output data 104, which comprises payload data and control signals, to the MAC unit 101. The PHY unit 102 further comprises a buffer 106 coupled to the interface unit 105, a data processing unit 107 coupled to the buffer, and an interface unit 108 coupled to the data processing unit 107, the operation of which is identical to the one of the corresponding components of the PHY unit 82 of FIG. 5. The PHY unit 102 further comprises a control unit 110 which is coupled to the interface unit 105 to provide a signal M 117 to the interface unit 105 which indicates a maximum amount of payload data that may be output at the interface 105.

The control unit 110 further comprises a pause frame generator 111 that is coupled to the interface unit 105 to output a pause frame at the interface unit 105 to the MAC unit 101. The MAC unit 101 comprises a pause frame processing unit 113 that receives the pause frame 112 and controls the outputting of data 103 from the MAC unit 101 to the PHY unit 102 responsive to the pause frame 112. In an embodiment, the pause frame processing unit 113 limits or reduces the flow of data 103 that is output from the MAC unit 101 or reestablishes a flow of data 103 in response to receiving the pause frame 112. The control unit 110 is coupled to the data processing unit 107 to receive a signal Tl 114 indicative of a time left until the data processing unit 107 will read data from the buffer 106. The control unit 110 determines the value M 117 that indicates a maximum data amount based on the time left Tl 114. The outputting of the signal M 117 and of a pause frame by the control unit 110 is further based on a current buffer filling level. However, in the exemplary embodiment of FIG. 6, the control unit 110 is not directly coupled to the buffer 106 to receive the current buffer filling level C 95 (FIG. 5) therefrom, but is rather coupled to the interface unit 105 to receive a signal bin 116 indicative of a data amount input into the buffer 106 and to the data processing unit 107 to receive a signal bout 115 indicative of a data amount read from the buffer 106, and determines the current buffer filling level based on the signals bin and bout, respectively.

As will be explained in more detail below, in the transmitters 80, 100 of the embodiments of FIGS. 5, 6, by controlling the amount of payload data that may be output via the interface units 85, 105 based on information on the reading of the buffer 86, 106, a timely transmission of control signals, such as Ethernet pause frames, from the PHY unit to the MAC unit may be afforded.

While, in the exemplary embodiments of FIGS. 5 and 6, the control units are shown to receive a signal Tl indicative of a time left before the next read operation from the data processing units, it is to be understood that the control unit may retrieve further information on the reading of the buffer from the data processing unit and may control the outputting of payload data and of a pause frame via the interface unit of the PHY unit based on this additional information. In an exemplary embodiment, the control unit controls the outputting of payload data based on an amount of data that is read from the buffer during a read operation. In an embodiment, the control unit controls the outputting of payload data from the PHY unit by limiting a maximum size of a data packet carrying payload data. In an embodiment, the control unit determines whether the maximum size of the data packet carrying payload data is to be limited at all based on one or several parameters. In another embodiment, the control unit determines the maximum data packet size based on the same one or several parameters, or based on other parameters.

The transmitters 80, 100 of the exemplary embodiments may be employed in various data communication systems. For illustrative purposes only, in an exemplary embodiment, the transmitter may be a DSL transmitter. In an exemplary embodiment, the transmitter is configured for VDSL2. In an exemplary embodiment, the data processing units 87, 107 may perform transmission convergence layer functions of signal processing. In an exemplary embodiment, the interface units 80, 108 may be coupled to a subscriber line.

Figure 8:
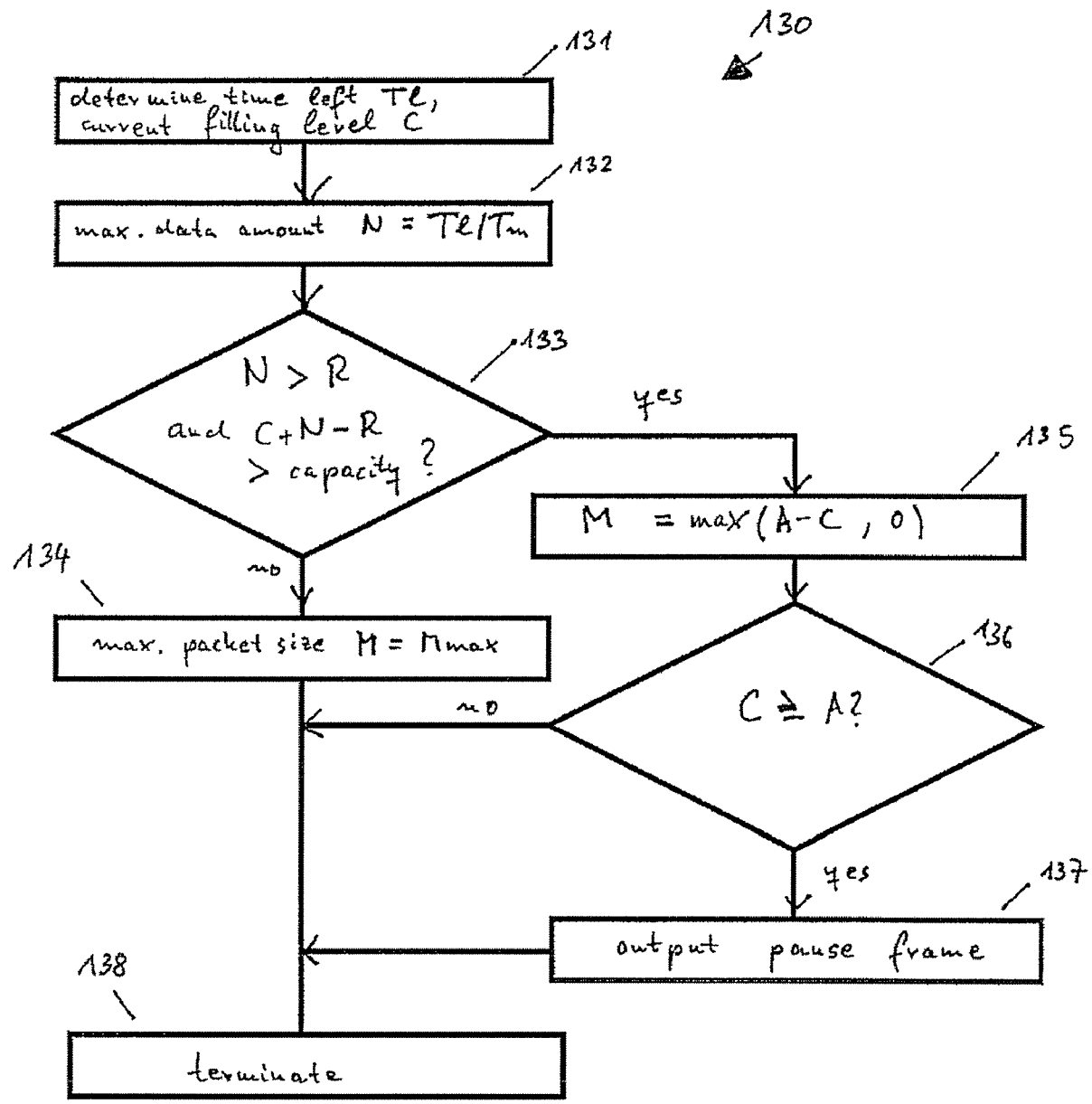
FIG. 8 is a schematic flow diagram representation of a method of controlling a data flow according to another embodiment of the invention.
Figure 9:
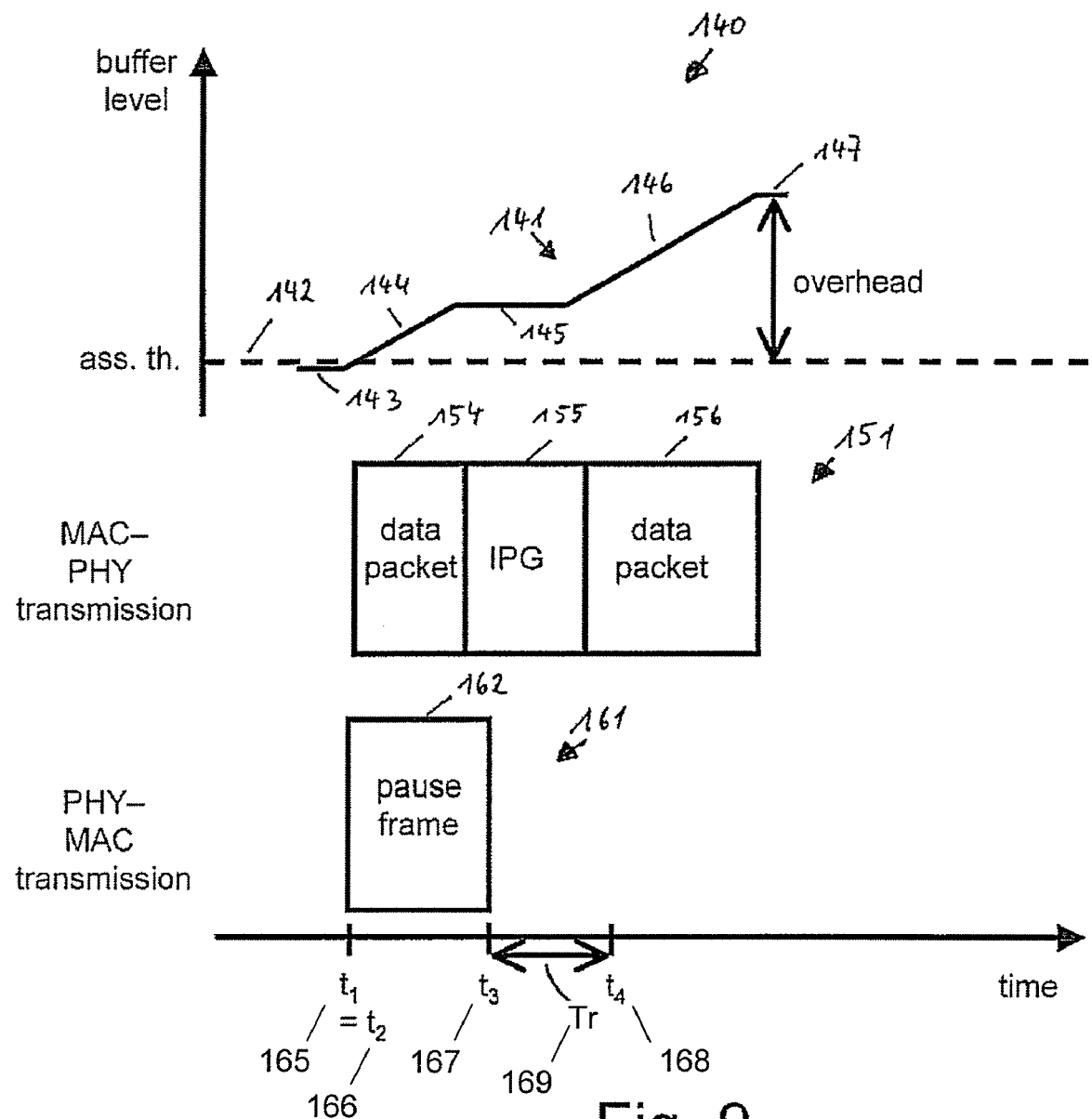
FIG. 9 is a schematic representation of a buffer filling level versus time in a transmitter according to an embodiment of the invention.

The control units 90, 110 of the transmitters 80, 100 according to the exemplary embodiments of FIGS. 5 and 6 may employ different methods to control the outputting of payload data at the respective interface unit. Methods according to different exemplary embodiments will next be explained, for illustrative purposes only, with reference to FIGS. 7-13. These exemplary methods may, for example, be performed by the control units of the transmitters according to the embodiments of FIGS. 5 and 6. While FIGS. 7-9 represent methods of asserting backpressure according to exemplary embodiments, i.e., for preventing an overflow of the buffer, FIGS. 10-13 represent methods of deasserting backpressure according to exemplary embodiments, i.e., for preventing starvation of a data processing unit that receives data from the buffer.

Figure 7:
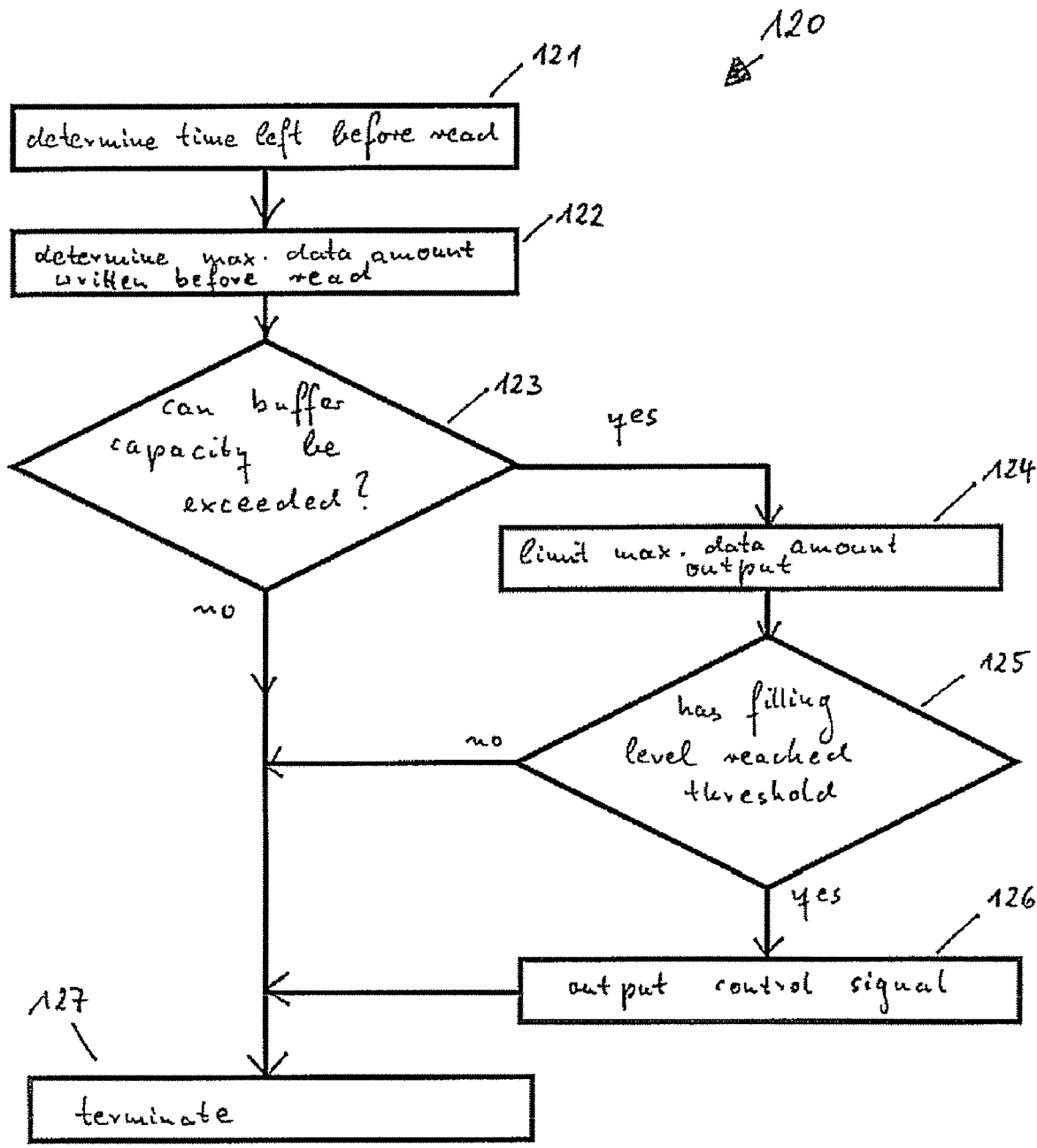
FIG. 7 is a schematic flow diagram representation of a method of controlling a data flow according to an embodiment of the invention.

FIG. 7 is a flow diagram representation of a method 120 according to an exemplary embodiment of the invention. At 121, a time left before a buffer is read, i.e., a time interval remaining until the buffer is read, is determined. At step 122, based on the time left determined at step 121, a maximum data amount that may be written into the buffer before the next read of the buffer is determined. In an embodiment, the maximum data amount is determined based on the time left before the next buffer read and a data transmission rate across the PHY-MAC interface. At 123, it is determined whether the buffer capacity may be exceeded before the next read. If the buffer capacity cannot be exceeded, the method terminates at 127. Otherwise, at 124 a data amount that may be output from the PHY unit for transmission across the PHY-MAC interface is limited. In an embodiment, the data amount that may be output is limited based on a current buffer filling level. In an embodiment, the data amount is limited by limiting a maximum size of a data packet carrying payload data. In another embodiment, the data amount that may be output is limited based on a current buffer filling level and the time left before the next read. At 125, it is determined whether the current buffer filling level has reached a predetermined threshold. In an embodiment, the threshold is a backpressure assertion threshold. If the filling level is determined to not have reached the threshold, yet, the method terminates at 127. Otherwise, at 126, a control signal is output at the interface unit. In an embodiment, the control signal output at 126 is a pause frame for asserting backpressure. The method terminates at 127.

After termination at 127, the method 120 may be repeated as appropriate. In an embodiment, data is transmitted across the PHY-MAC interface in packetized form. In this embodiment, the method 120 may be repeated after the completion of transmission of a data packet in the MAC-PHY direction. According to another embodiment, the maximum amount of data that may be output at the interface is continuously adjusted as data from the MAC unit is received at the PHY unit and as the time left before the next read decreases.

It is to be understood that the limiting of the maximum data amount that may be output at the interface at 124 may be achieved in various ways. In an embodiment, if data is transmitted from the PHY unit to the MAC unit in packetized form, the maximum data amount may be limited by limiting a maximum data packet size. This will be explained in more detail with reference to FIG. 8 next.

FIG. 8 is a flow diagram representation of a method 130 according to a further exemplary embodiment of the invention, in which a pause frame is generated and transmitted in order to control a flow of data input into the buffer so as to prevent buffer overflow. At 131, a time left Tl before a next buffer read as well as a current filling level C of the buffer are determined. At 132, a maximum data amount N that may be written into the buffer before the next read is determined as N=Tl/Tm, where Tl is the time left before the next read and Tm is the time required for transferring one byte of data across the MAC-PHY interface. In an exemplary embodiment, in which the MAC-PHY interface is a 100 Mbit/s interface, Tm=80 ns. At 133, the maximum data amount that may be received via the MAC-PHY interface N is compared to the data amount R that is read from the buffer in the next read. In an embodiment, the buffer is read in bursts, the amount R of data read in a burst being approximately constant. Further, at 133, C+N−R is compared to the total buffer capacity. If, at 133, N is found to be less than R, or C+N−R is found to be less than the buffer capacity, at 134 the value M that is a maximum allowed packet size output from the PHY unit to the MAC unit is set equal to its maximum value Mmax. Otherwise, at 135, M is set equal to max (A−C, 0), where A is a backpressure assertion threshold. At 136 the current buffer filling level C is compared to the backpressure assertion threshold A. If the current buffer filling level C is found to exceed the backpressure assertion A at 136, a pause frame is output at 137. Otherwise, the method terminates at 138. According to a further embodiment, the pause frame may be generated when the current filling level C is equal to or greater than the threshold A.

In various other embodiments, various modifications of the exemplary method 130 of FIG. 8 may be implemented. In one embodiment, at 133 it is determined whether C+N>A, i.e., whether the backpressure assertion threshold A may be exceeded before the next read begins. In another embodiment, at step 135, M is set equal to max (A−C−IPG/Tm, 0), where IPG is the interpacket gap in time. By accounting for the interpacket gap in limiting the maximum data packet size, it is ensured that no payload data is transmitted at the time at which the buffer filling level reaches the assertion threshold, and that in addition the control signal, e.g., the pause frame, may be transmitted immediately when the buffer filling level reaches the assertion threshold. In another embodiment, rather than limiting the maximum packet size, the amount of payload data that may be included in a packet may be limited. In an embodiment, the maximum amount of payload data is limited to max (A−C−F, 0), where F is an amount of bytes required for framing or packetizing the payload data and includes, e.g., a start frame delimiter (SFD) and an Ethernet frame preamble. In one embodiment, the maximum amount of payload data is limited to max (A−C−IPG/Tm−F, 0).

FIG. 9 is a schematic representation of a buffer filling level versus time for a transmitter which employs the method of FIG. 8. The representation 140 shows the buffer filling level 141 as well as data 151 transmitted from a MAC unit to a PHY unit and data 161 transmitted from the PHY unit to the MAC unit. For the schematic representation of FIG. 9, it is assumed that the maximum size of a data packet that is transmitted from the PHY unit to the MAC unit is limited to M=max (A−C−IPG/Tm, 0) as the assertion threshold is approached, thereby keeping the PHY-MAC interface free of payload data traffic in the PHY-MAC transmission direction at the time at which the assertion threshold is reached. As shown in FIG. 9, the buffer filling level is initially at a level 143 just below the assertion threshold 142. Upon receiving a data packet 154 from the MAC unit, the assertion threshold 142 is crossed at time $t_1$ 165. Since the MAC-PHY interface is kept free from payload data traffic in the PHY-MAC transmission direaction at this time, a pause frame 162 may be transmitted as soon as the buffer filling level reaches the assertion threshold 142. In other words, the time $t_2$ 166 at which the transmission of the pause frame 162 is started is equal or about equal to the time $t_1$ 165 at which the assertion threshold 142 is reached. Transmission of the pause frame 162 is completed at time $t_3$ 167 After processing of the pause frame 162 by the MAC unit, which requires the pause frame reaction time Tr 169, the backpressure assertion takes effect at time $t_4$ 168. In a worst case scenario, as schematically shown in FIG. 9, the MAC unit starts transmission of a data packet 156 to the PHY unit just before time $t_4$ 168. In this case, a data packet 154 of size (Tr−IPG)/Tm+P and a data packet 156 that may have the maximum possible packet size Mmax may be transmitted from the MAC unit to the PHY unit until the backpressure assertion has taken effect, resulting in corresponding increases 144, 146 of the buffer filling level. The overhead in buffer capacity required above the backpressure assertion threshold is given by Eq. (2):

$$O_A = M\max + \frac{Tr - IPG}{Tm} + P. \quad (2)$$

As may be seen by comparison with FIG. 3, according to the embodiment of FIG. 8, a timely backpressure assertion may be achieved, thereby reducing the buffer overhead required above the assertion threshold.

FIG. 10 is a flow diagram representation of method 170 according to another embodiment of the invention. More specifically, method 170 is a method for backpressure deassertion according to an exemplary embodiment of the invention. Backpressure deassertion is usually performed in situations in which the backpressure assertion process has already taken effect, e.g., in situations in which a pause frame for asserting backpressure has already been sent and, possibly, processed. In this situation, there is usually no flow of data from the MAC unit to the PHY unit. The method 170 may be performed, for example, by the control units 90 and 110 of the transmitters 80 and 100 of the exemplary embodiments of FIGS. 5 and 6, respectively. At 171, the current buffer filling level is determined. At 172, it is determined whether the current buffer filling level has reached a threshold. If the current buffer filling level is determined to have reached the threshold, at 173 a control signal is output. In an embodiment, the control signal may be a backpressure deassertion signal. If is determined at 172 that the current filling level has not yet reached the threshold, at 174 a time is determined that is left until the threshold will be reached. In another embodiment, a lower bound on the time that is left until the threshold will be reached is determined. At 175, a time at which a control signal is intended to be output is determined based on the time at which the threshold will be reached. At 176, a maximum data amount that may be output at the PHY-MAC interface is limited based on the time at which the control signal is intended to be output. The method terminates at 177. The method may be repeated if appropriate. In an embodiment, the method 170 is repeated in predefined time intervals. In another embodiment, the method 170 is repeated whenever a predetermined amount of data has been received at the PHY unit from the MAC unit. In yet another embodiment, the method 170 is performed whenever transmission of a data packet from the MAC unit to the PHY unit has been completed.

As will be described in more detail below, the time until the threshold will be reached and the time at which the control signal is intended to be output may be determined in various different ways. In an embodiment, the time until the threshold will be reached determined at 174 is determines based on a time left before a read operation of the buffer, the current filling level of the buffer, and a total amount of data read from the buffer in a read operation. In an embodiment, the time at which the control signal is intended to be output and which is determined at step 175 is equal to the time at which the buffer filling level will reach the threshold. In another embodiment, the time at which the control signal is intended to be output determined at 175 is earlier than the time at which the threshold will be reached to accommodate for delays in transmitting a pause frame and/or processing the pause frame.

Figure 11:
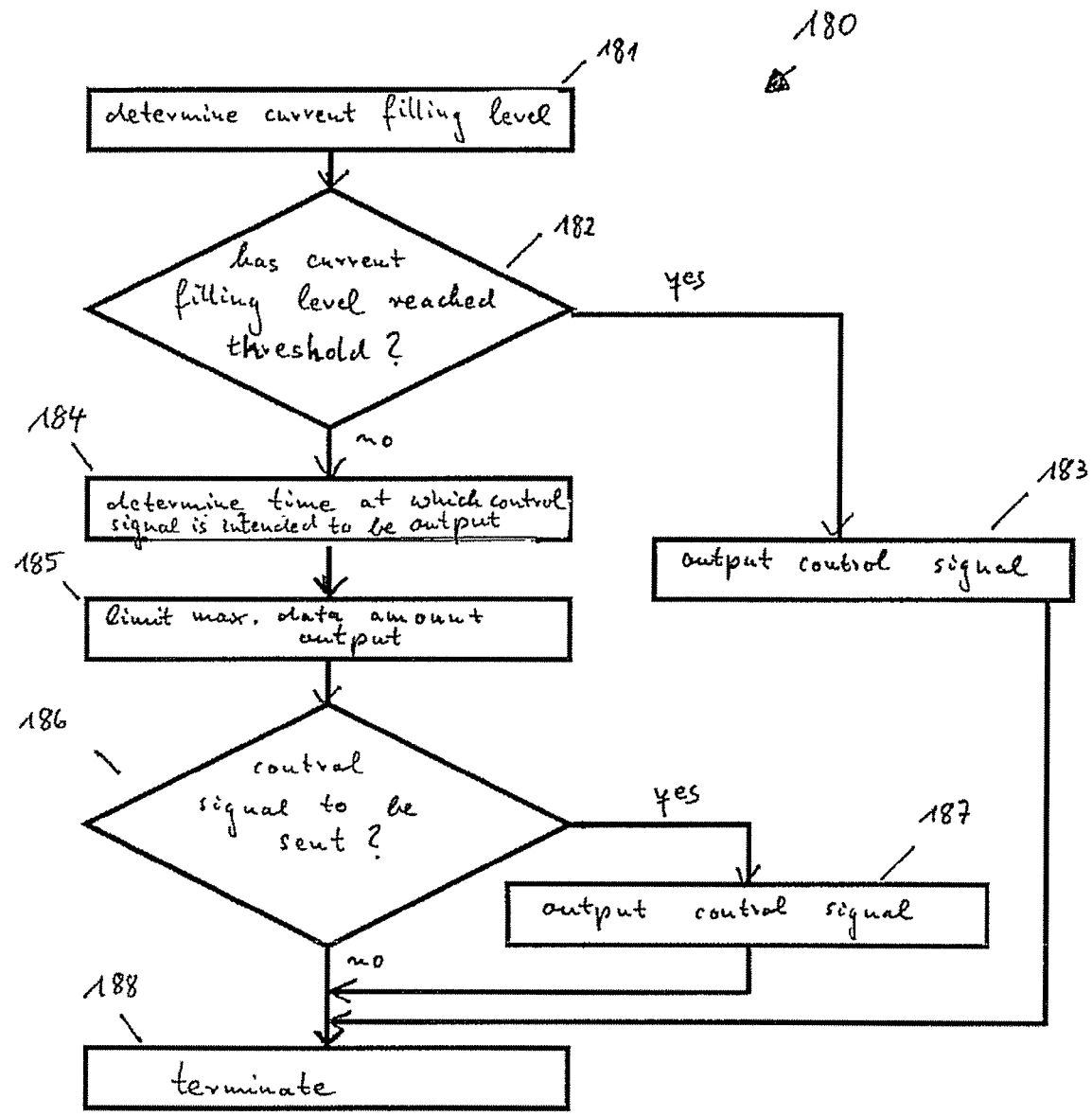
FIG. 11 is a schematic flow diagram representation of a method of controlling a data flow according to another embodiment of the invention.

FIG. 11 is a schematic block diagram representation of a method 180 according to another embodiment of the invention. In an embodiment, the method may be performed by the control units 90, 110 of the exemplary embodiments of FIGS. 5 and 6, respectively. The method 180 according to the exemplary embodiment of FIG. 11 allows the control signal to be output also prior to reaching the threshold level. In one embodiment, the time at which the threshold level will be reached is estimated and the control signal is output based on the estimated time.

At 181, a current filling level of a buffer is determined. At 182, it is determined whether the current filling level has reached a threshold. If the threshold has been reached, at 183, a control signal is output from the PHY unit to the MAC unit. In an embodiment, the control signal is a pause frame for deasserting backpressure. If it is determined that the current filling level has not yet reached the threshold at 182, at 184 a time at which a control signal is intended be output is determined. In an embodiment, determining the time at which the output of a control signal is intended may comprise determining a time at which the filling level will reach the threshold. At 185, a maximum data amount that may be output from the PHY unit to the MAC unit is limited based on the time determined at 184. At 186, it is determined whether the control signal should be output. Based on the result of the determining at 186, the control signal is output at 187, or otherwise, the method terminates at 188. After termination at 188, the method 180 may be repeated as appropriate.

Figure 12:
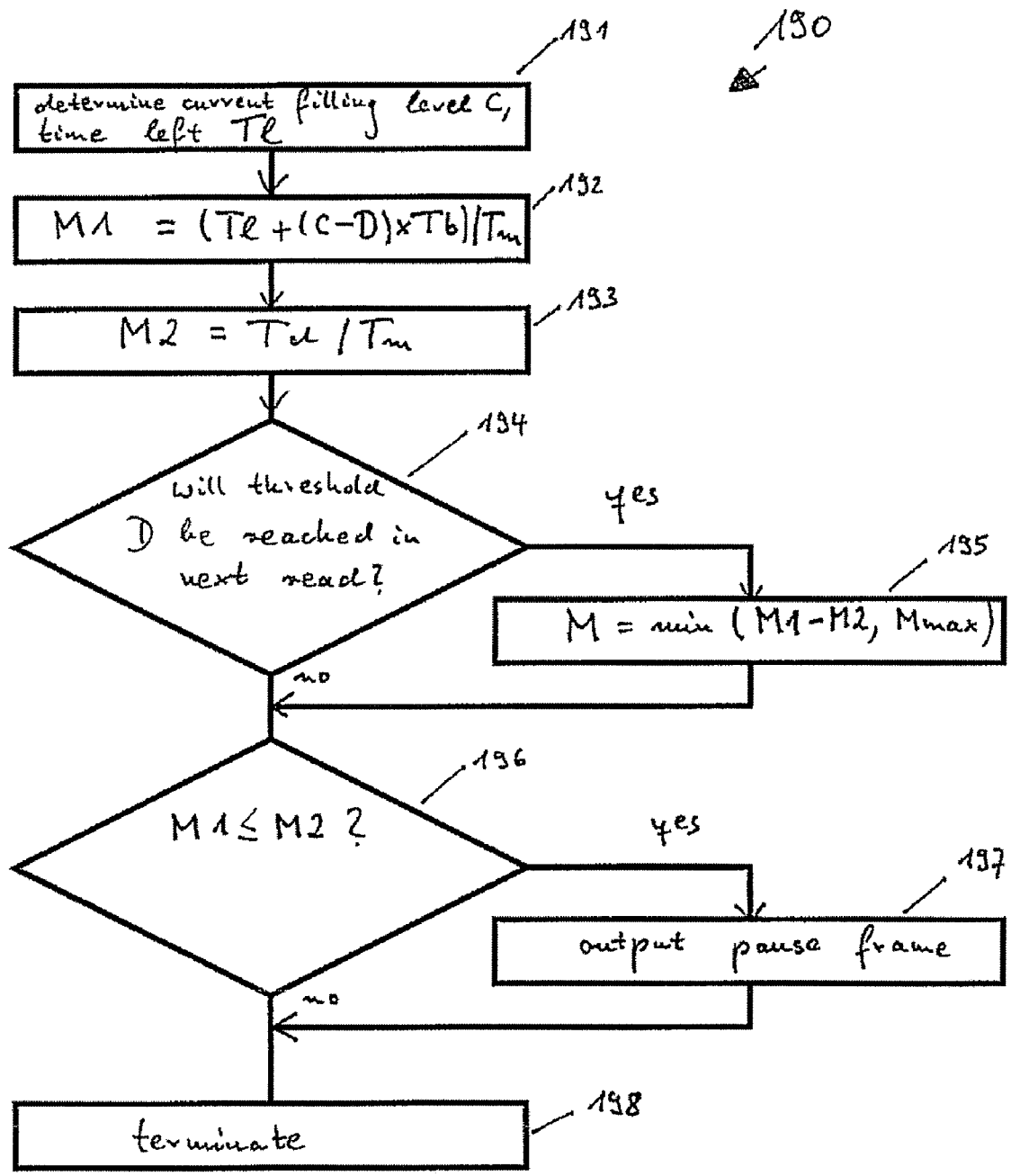
FIG. 12 is a schematic flow diagram representation of a method of controlling a data flow according to another embodiment of the invention.

FIG. 12 is a flow diagram representation of a method 190 according to another embodiment of the invention. The method 190 of the exemplary embodiment of FIG. 12 provides an implementation for backpressure deassertion in which a maximum amount of data output is limited by appropriately limiting a maximum size for data packets carrying payload data.

The method 190 may be performed by the control units 90, 110 of the transmitters 80, 100 of the exemplary embodiments of FIGS. 5 and 6, respectively. At 191, a current buffer filling level C and a time Tl left before a next buffer read are determined. At 192, a first data amount M1=(Tl+(C−D)·Tb)/Tm is determined, where D is a backpressure deassertion threshold, Tb is a time required to read one byte of data from the buffer, and Tm is the data rate across the MAC-PHY interface. The first data amount M1 corresponds to a data amount that can be output from the PHY unit to the MAC unit during a time until the buffer filling level reaches the backpressure deassertion threshold, assuming that the buffer is not written into while being read. At 193, a second data amount M2=Td/Tm is determined, where Td represents a delay time between completion of transmission of a payload data packet from the PHY unit to the MAC unit and the time at which backpressure deassertion takes effect. In an embodiment, Td=IPG+P·Tm+Tr, where IPG is the interpacket gap in time, P is the size of a pause frame, Tm is the transmission rate across the PHY-MAC interface, and Tr is the reaction time of the MAC unit after receiving the pause frame. At 194, it is determined whether the threshold D will be reached in the next read. In an embodiment, the comparison at 194 comprises determining an amount of data R that will be read from the buffer in the next read, and comparing C−D to R. If C−D≦R, the threshold D will be reached in the next read. If it is determined that the threshold D will be reached in the next read, at 195 a maximum packet size for data packets carrying payload data transmitted from the PHY unit to the MAC unit is set equal to M=min (M1−M2, Mmax), where Mmax is a maximum allowed packet size. If it is determined at 194 that the threshold D will not be reached in the next read, the method proceeds directly from 194 to 196. At 196, it is determined whether M1 is equal to or less than M2. If M1≦M2, at 197 a pause frame is output to deassert backpressure. The method terminates at 198. Again, many modifications of the exemplary method 190 may be implemented. In one embodiment, the method may further comprise a comparison of the current filling level to the threshold, a control signal, such as a pause frame, being output based on the comparison.

Figure 13:
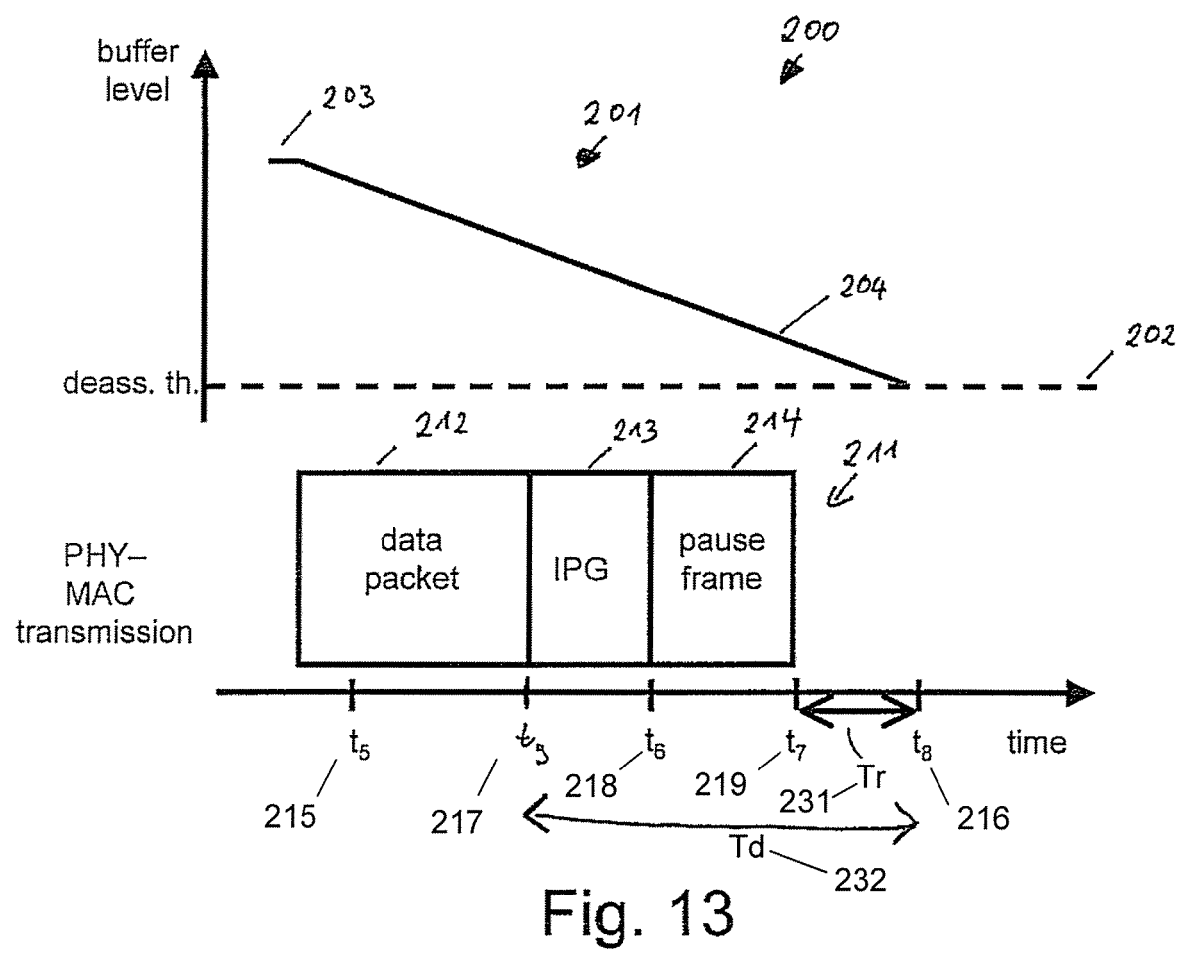
FIG. 13 is a schematic representation of a buffer filling level versus time in a transmitter according to an embodiment of the invention.

FIG. 13 schematically shows a graphical representation 200 of a buffer filling level 201 versus time for a transmitter according to an exemplary embodiment that employs the method of FIG. 12. FIG. 13 shows the buffer filling level 201 and a schematic representation 211 of data transmitted from the PHY unit to the MAC unit. Initially, the buffer filling level is at a value 203. At time $t_5$ 215, a read of the buffer starts, resulting in a decrease 204 of the buffer filling level. At time $t_8$ 216, the buffer filling level reaches a deassertion threshold 202. According to the method 190 of the exemplary embodiment of FIG. 12, even at times prior to time $t_5$ 215, the time $t_8$ 216 at which the buffer filling level will reach the deassertion threshold can be determined, or at least a lower bound on time $t_8$ 216 may be established, based on the time Tl left before the next read and the value of the current buffer filling level. Therefore, according to the exemplary method of FIG. 12, the size of a data packet 212 carrying payload data from the PHY unit to the MAC unit is limited in such a way that its transmission will be completed at a time $t_9$ 217 which is at least a time Td 232 before the time $t_8$ 216 at which the buffer filling level reaches the deassertion threshold. I.e., the transmission of the data packet 212 ends at a time $t_9$ 217 that allows a pause frame 214 to be transmitted from the PHY unit to the MAC unit between $t_6$ 218 and $t_7$ 219 after an interpacket gap 213, and accounts for the MAC unit reaction time Tr 231 so that backpressure deassertion takes effect at the time at which the buffer filling level reaches the deassertion threshold.

While various methods that may be performed, for example, by a control unit of a transmitter according to an embodiment of the invention have been described with reference to FIGS. 7-13 above, various modifications of these methods may be implemented in various other embodiments. For example, for the embodiments of FIGS. 7 and 8, an arbitrary upper bound on the data amount that can be written into the buffer before the next read may be determined instead of the exact maximum data amount. Similarly, for the embodiments of FIGS. 10-12, a lower bound on the time until the buffer filling level will reach the threshold value and/or a lower bound on the time at which a control signal is intended to be output may be determined instead of the exact times. In other embodiments, data amounts corresponding to the respective times are determined rather than explicitly determining the respective times.

Further, it will be appreciated that a control unit of a transmitter according to an embodiment of the invention, e.g. the control units 90, 110 of FIGS. 5 and 6, respectively, may perform both a method for asserting backpressure according to any one embodiment described above and a method for deasserting backpressure according to any one embodiment described above. In other embodiments, only a method for asserting backpressure according to any one embodiment described above or only a method for deasserting backpressure according to any one embodiment described above is performed by the control unit.

Figure 14:
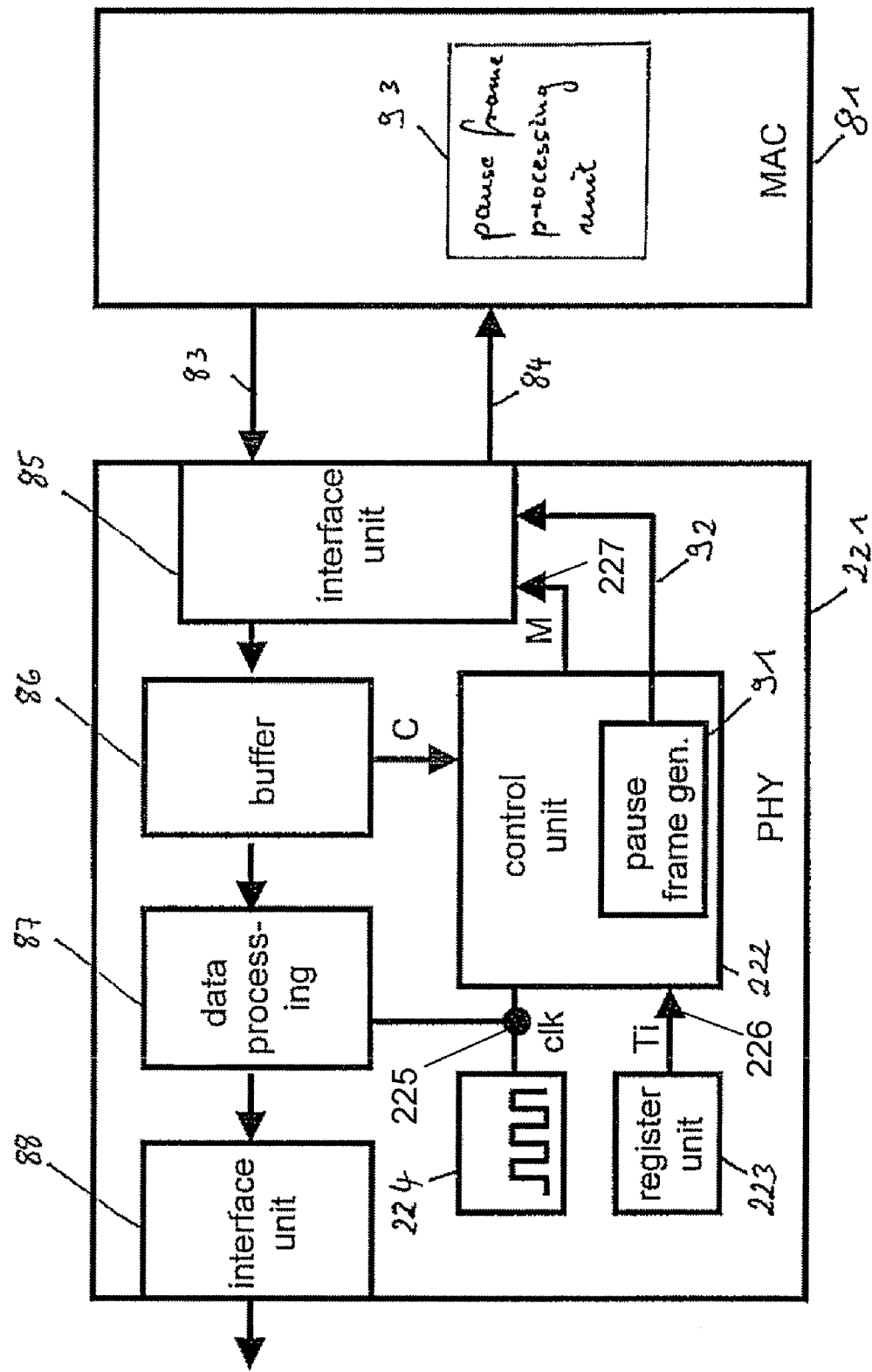
FIG. 14 is a schematic block diagram representation of a transmitter according to another embodiment of the invention.

While the present invention has been described with reference to exemplary embodiments above, it is to be understood that many modifications and variations of these embodiments may be implemented in other embodiments. For example, while for some of the embodiments described above the control unit is coupled to the data processing unit to receive a signal indicative of a time left before the next read of the buffer, in another embodiment, the control unit may retrieve this time information in a different way. FIG. 14 is a schematic block diagram representation of a transmitter 220 according to another embodiment of the invention which comprises a MAC unit 81 and a PHY unit 221 which in turn comprises an interface unit 85, a buffer 86, a data processing unit 87, and an interface unit 88, the configuration, coupling and operation of which is identical to the one of the corresponding components of the transmitter 80 of the exemplary embodiment of FIG. 4. The PHY unit 221 further comprises a control unit 222, a register unit 223 and a clock generator 224, the control unit 222 including a pause frame generator 91. The control unit 222 is coupled to the interface unit 85 to provide a signal M 227 indicative of a maximum size of a data packet carrying payload data to the interface unit and to output a pause frame via the interface unit. The control unit 222 lmits the maximum size of data packets carrying payload data based on the time left before the next read operation of the buffer 86. The control unit 222 is coupled to the register unit 223 to retrieve information on a time interval Ti 226 between successive read operations from the register unit 223, and is coupled to the clock pulse generator 224 to receive a clock pulse clk 225 from the clock pulse generator 224. The data processing unit 87 also receives the clock pulse signal clk 225 from the clock pulse generator 224. Based on the time interval Ti 226 and the clock pulse signal clk 225, the control unit 222 determines the time left before the next read, for example by decrementing the value Ti 226 by one for each clock pulse received.

Further, it is to be understood that any functional unit or block shown in the drawings and described above is shown as a separate entity only for the purpose of better explaining the principles of the present invention. Any such functional block or unit may be comprises of several functional sub-blocks or sub-units, or several of the functional blocks or units may be formed integrally with one another. Further, while the pause frame generator has been shown to be comprised by the control unit in some of the exemplary embodiments described above, it is to be understood that the pause frame generator may also be provided separately from the control unit.

While the MAC unit and the PHY unit have been shown as separate entities in the drawings, it is to be understood that the MAC unit and the PHY unit may also be configured as a single integrated circuit, one portion of which performs MAC layer functions and another portion of which performs PHY layer functions. In an embodiment, the MAC unit and the PHY unit are comprised by a DSL chip. In one embodiment, the MAC unit and the PHY unit are comprised by a VDSL2 chip.

Further, while exemplary embodiments have been described with reference to a MAC unit and a PHY unit above, it is to be understood that the present invention is not limited thereto, but is equally applicable to any other device comprising a first unit and a second unit between which data and control signals are transmitted. Further, any functional unit or component shown in the drawings and explained above may be implemented in hardware, in software or in a combination of both, it being understood that all such embodiments are considered to be comprised by the present invention as it is defined by the appended claims.

What is claimed is:

1. A method of controlling a data flow of a transmitter, comprising:
   receiving first data at a first interface;
   buffering said first data in a buffer;
   outputting said first data via a second interface,
   determining information regarding an estimated amount of second data comprising payload data output via said first interface until a filling level of said buffer will reach a predetermined threshold;
   adjusting an amount of said payload data output via said first interface based on said determined information; and
   outputting said payload data via said first interface.

2. The method of claim 1,
   wherein said determining comprises determining a lower bound on an amount of said payload data output via said first interface until said filling level of said buffer will reach said predetermined threshold.

3. The method of claim 1,
   wherein said determining comprises determining a lower bound on a time required for said filling level of said buffer to reach said predetermined threshold.

4. The method of claim 1,
   wherein said filling level decreases in a read operation of said buffer, and said determining comprises determining a time left until a read operation is performed.

5. The method of claim 4,
   wherein said determining comprises determining a current filling level of said buffer, wherein said information is determined based on said time left and said current filling level.

6. The method of claim 4,
   wherein said determining comprises determining an upper bound on an amount of said first data received at said first interface during said time left.

7. The method of claim 5, comprising
   comparing said current filling level to said predetermined threshold, and
   outputting a control signal via said first interface based on said comparing to control a flow of said first data.

8. The method of claim 7,
   wherein said control signal comprises an Ethernet pause frame.

9. The method of claim 1,
   wherein said payload data is output as a data packet and said adjusting comprises limiting a size of said data packet.

10. The method of claim 1,
    wherein said buffer is provided to store only said first data received via said first interface.

11. A transmitter, comprising:
    an interface to output payload data and a control signal,
    a buffer to buffer further data received via said interface, wherein said control signal controls a flow of said further data; and
    a control unit coupled to said buffer to determine information regarding an estimated data amount output via said interface until a filling level of said buffer will reach a predetermined threshold,
    wherein said control unit is configured to limit an amount of said payload data output via said interface based on said information.

12. The transmitter of claim 11,
    wherein said control unit determines a lower bound on a time required for said filling level of said buffer to reach said predetermined threshold.

13. The transmitter of claim 11, comprising
    a processing unit coupled to said buffer to read said buffer, wherein said control unit receives an indicator of a time left until said processing unit reads said buffer.

14. The transmitter of claim 13,
    wherein said control unit receives an indicator of a current filling level of said buffer and determines said information based on said time left and said current filling level.

15. The transmitter of claim 13,
    wherein said control unit determines an upper bound on an amount of said further data received via said interface during said time left.

16. The transmitter of claim 14,
    wherein said control unit compares said current filling level and said predetermined threshold and outputs said control signal via said interface based on said comparison.

17. The transmitter of claim 11,
    wherein said control signal comprises an Ethernet pause frame.

18. The transmitter of claim 11,
    wherein said payload data is output as a data packet and said control unit limits a size of said data packet.

19. A method of controlling a data flow between a first and second unit of a transmitter, comprising:
    transmitting first data from said first unit to said second unit via an interface;
    buffering said first data in a buffer of said second unit;
    transmitting second data from said second unit to said first unit via said interface;
    generating data flow control information based on an amount of said first data buffered in said buffer;
    controlling a start of transmission of said data flow control information based on said amount of said first data buffered in said buffer;
    transmitting said data flow control information from said second unit to said first unit via said interface;
    outputting said first data from said buffer;
    retrieving information on said outputting; and
    controlling said transmitting of said second data based on said retrieved information by predicting a lower bound on a time at which said data flow control information is to be transmitted.

20. The method of claim 19, comprising
    processing said data flow control information in said first unit.

21. The method of claim 19, comprising
    controlling a flow of said first data based on said data flow control information.

22. The method of claim 19,
    wherein said data flow control information comprises a pause frame.

23. The method of claim 19,
    wherein said first data are transmitted across a duplex data link in one transmission direction, and said second data and said data flow control information are transmitted across said duplex data link in a reverse transmission direction.

24. The method of claim 19,
    wherein said retrieved information comprises information on a time at which said first data will be output from said buffer.

25. The method of claim 19,
    wherein said retrieved information comprises information on an amount of said first data that will be output from said buffer.

26. The method of claim 19,
comprising preventing transmitting said second data at said time at which said data flow control information is to be transmitted.

27. The method of claim 19,
wherein said transmitting said second data is controlled based on said amount of said first data buffered in said buffer.

28. The method of claim 19,
wherein said interface is a media independent interface (MII).

29. The method of claim 28,
wherein said first unit comprises a physical (PHY) layer unit and said second unit comprises a media access control (MAC) layer unit.

30. The method of claim 19,
wherein said second data comprise data received at a further interface of said second unit from a further transmitter.

31. A transmitter, comprising:
a first unit comprising a processing unit to process data flow control information;
a second unit comprising a buffer and a generator unit to generate said data flow control information;
wherein said second unit is coupled to said first unit via an interface to receive first data from said first unit and to buffer said received first data in said buffer;
wherein said generator unit comprises an input to receive an indicator of an amount of said first data buffered in said buffer and generates said data flow control information based on said indicator; and
wherein said second unit comprises a control unit having an input to receive information on an outputting of said first data from said buffer, wherein said control unit controls a transmission of second data from said second unit to said first unit based on said information and predicts a lower bound on a time at which said data flow control information is to be transmitted.

32. The method of claim 31,
wherein said data flow control information comprises a pause frame.

33. The transmitter of claim 31,
wherein said information on said outputting comprises information on a time at which said buffer will output said first data.

34. The transmitter of claim 31,
wherein said information on said outputting comprises information on an amount of said first data that will be output from said buffer.

35. The transmitter of claim 31,
wherein said control unit prevents transmission of said second data at said time at which said data flow control information is to be transmitted.

36. The transmitter of claim 31,
wherein said control unit comprises a further input to receive said indicator of said amount of said first data buffered in said buffer and controls transmission of said second data based on said indicator.

37. The transmitter of claim 31,
wherein said interface is a media independent interface (MII).

38. The transmitter of claim 37,
wherein said first unit comprises a physical (PHY) layer unit and said second unit comprises a media access control (MAC) layer unit.

39. A transmitter, comprising:
a bidirectional interface to receive first data in a first transmission direction and to transmit second data in a second transmission direction, said first data comprising first payload data and said second data comprising second payload data and control information related to a control of a flow of said first data in the first transmission direction;
a buffer dedicated to buffer said first data received via said bidirectional interface;
a transmitter interface coupled to said buffer to receive said first data from said buffer and to transmit said first data to a receiver;
a control unit coupled to said bidirectional interface to adjust a time of starting transmission of said control information based on an amount of said first data buffered in said buffer.

40. The transmitter according to claim 39,
wherein said control unit is configured to adjust said time of starting transmission of said control information by adjusting an amount of said second payload data transmitted via said bidirectional interface based on said amount of said first data buffered in said buffer.

41. The transmitter according to claim 40,
wherein said control unit is configured to adjust said time of starting transmission of said control information by adjusting a packet size of a data packet comprising said second payload data based on said amount of said first data buffered in said buffer.

42. The transmitter according to claim 41,
wherein said packet size is decreased when a difference between said amount of said first data buffered in said buffer and a predetermined threshold level decreases.

43. A transmitter, comprising:
a first unit comprising a processing unit operable to process data flow control information;
a second unit comprising a buffer and a generator unit operable to generate said data flow control information;
wherein said second unit is coupled to said first unit via an interface operable to receive first data from said first unit and to buffer said received first data in said buffer;
wherein said generator unit comprises an input operable to receive an indicator of an amount of said first data buffered in said buffer, said generator unit being operable to compare said amount of said first data buffered in said buffer to a predetermined threshold and generate said data flow control information based on a result of said comparison; and
wherein said second unit comprises a control unit having an input operable to receive information on an outputting of said first data from said buffer, wherein said control unit is operable to control a transmission of second data from said second unit to said first unit based on said information and predict a lower bound on a time at which said data flow control information is to be transmitted.

* * * * *